US008661888B2

(12) United States Patent
Popov et al.

(10) Patent No.: US 8,661,888 B2
(45) Date of Patent: Mar. 4, 2014

(54) METHOD OF STUDYING ROCK MASS PROPERTIES AND APPARATUS FOR THE IMPLEMENTATION THEREOF

(75) Inventors: Yury Anatolyevich Popov, Moscow (RU); Anton Vladimirovich Parshin, Moscow (RU); Vyacheslav Pavlovich Pimenov, Moscow (RU); Sergey Sergeevich Safonov, Moscow (RU); Vladimir Petrovich Stenin, Moscow (RU); Victor Vasilyevich Kostylev, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 644 days.

(21) Appl. No.: 12/981,026

(22) Filed: Dec. 29, 2010

(65) Prior Publication Data
US 2011/0156707 A1    Jun. 30, 2011

(30) Foreign Application Priority Data
Dec. 30, 2009   (RU) ................................ 2009149027

(51) Int. Cl.
*E21B 47/06*    (2012.01)
(52) U.S. Cl.
USPC ...................................... 73/152.13; 73/152.02
(58) Field of Classification Search
USPC ............................. 73/152.02, 152.12, 153.13
See application file for complete search history.

(56) References Cited

U.S. PATENT DOCUMENTS

| 5,159,569 | A | | 10/1992 | Xu et al. |
| 5,353,873 | A | * | 10/1994 | Cooke, Jr. ........................ 166/64 |
| 5,509,474 | A | * | 4/1996 | Cooke, Jr. ........................ 166/64 |
| 6,905,241 | B2 | * | 6/2005 | Zazovsky et al. ............. 374/134 |
| 7,682,074 | B2 | * | 3/2010 | Shammai ....................... 374/136 |
| 7,937,999 | B2 | * | 5/2011 | Blanz et al. ................ 73/152.04 |

FOREIGN PATENT DOCUMENTS

RU            2334100 C2     9/2008

OTHER PUBLICATIONS

Dakhnov, V. N., "Promyslovaya Geofizika (Production Geophysisc) (Oilfield Geophysics Methods, Equipment and Hardware, Borehole Study Electrical Engineering Methods)", Moscow, Gostopizdat, 1959, pp. 56-59.

* cited by examiner

Primary Examiner — John Fitzgerald

(57) ABSTRACT

A thermal disturbance of a rock mass is performed by circulating a fluid through a borehole, a temperature of the circulation fluid differs from a temperature of the rock mass. Before, during and after the thermal disturbance, differential electrical signals proportional to a temperature difference between two points along the borehole are registered by at least one pair of differential temperature transducers disposed along an axis of the borehole Differential electrical signals measured before the thermal disturbance are compared with differential electrical signals measured during the thermal disturbance and differential electrical signals of different temperature transducers positioned along the wellbore borehole are compared with one another. Based on the comparison results of different rock mass areas with different properties are identified.

29 Claims, 1 Drawing Sheet

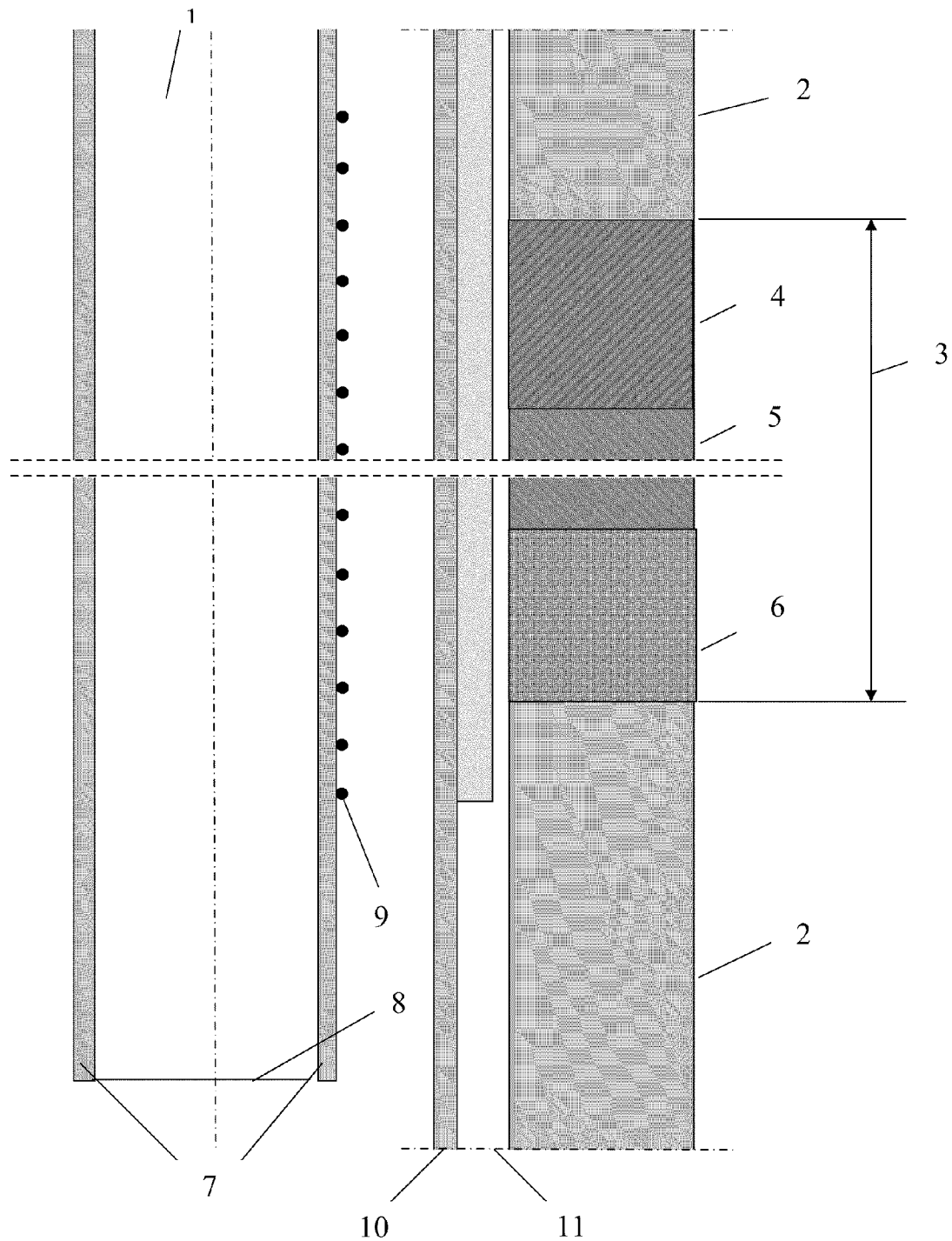

METHOD OF STUDYING ROCK MASS PROPERTIES AND APPARATUS FOR THE IMPLEMENTATION THEREOF

FIELD OF THE INVENTION

The invention is related to studying a rock mass and processes therein by means of borehole measurements, particularly by measuring temperature in boreholes. Examples of such measurements are temperature measurements in a borehole drilled in a rock mass having an oil reservoir when a thermal regime of the rock mass is changed by cooling or heating the rock mass through injecting a circulation fluid with a temperature different from temperature of the rock mass with subsequent recording of temperature in the borehole at different depths. Then zones with different oil content are identified based on the measured temperature. Such measurements are used, for example, to improve oil fields' development efficiency. The invention is also related to studying properties of rock masses being reservoirs with geothermal fluid and vapor. The invention may be applied to study rock masses with ore mineral deposits.

BACKGROUND OF THE INVENTION

A method for determining rock mass properties is described in: V. N. Dakhnov *Promyslovaya Geofizika (Production Geophysisc)*, Moscow, Gostopizdat, 1959, pp. 56-59. This method comprises measuring temperature distribution along a borehole drilled in a rock mass after a thermal disturbance of the rock mass by circulating a fluid with temperature different from temperature of the rock mass and subsequent identification of zones of productive layers with different properties. In this case the zones of the productive layers are identified by a difference between temperature in the zones of the productive layers and temperature of non-productive areas after the circulation. A disadvantage of this method is the difficulty in identifying the zones of the productive layers when these zones are separated from the borehole by layers with invasion of the circulation fluid due to the impossibility to record small temperature drops between the zones of the productive layers and the non-productive areas against the background of large absolute values of temperature typical for the rock mass at oil occurrence depths. Another disadvantage of this method is the fact that the temperature in the borehole is recorded after circulation of the fluid in the borehole when a temperature profile at the boundaries of the layers of the rock mass with different properties is blurred due to conductive heat transfer process between the rock mass sections with different temperature. Yet another disadvantage of this method is the fact that the time period during which the borehole temperature profile should be recorded is not defined which reduces the efficiency of the method. One more disadvantage is the impossibility to measure the rock mass temperature as a function of time at each selected depth which also reduces the sensitivity of the method because it does not enable differentiation between effect of a noise and effect of rock mass properties on temperature changes in time.

An apparatus for studying properties of rock mass is described in: V. N. Dakhnov *Promyslovaya Geofizika (Production Geophysisc)*, Moscow, Gostopizdat, 1959, pp. 56-59. The apparatus comprises a circulation fluid supply unit, a temperature sensor, an electronic unit to record and process a temperature signal, a cylindrical enclosure in which the temperature sensor, the electronic unit, a cable to run the cylindrical enclosure into the well, to transmit the supply voltage and to transmit measurement results to the surface are located. The apparatus is used for the implementation of the above method of studying rock mass properties. A disadvantage of this apparatus is the impossibility to record the borehole temperature distribution during the circulation of the fluid which results, as mentioned before, in extended measurement time, indistinct identification of boundaries of the rock mass layers with different properties. Another disadvantage is the presence of only one temperature sensor which results in the insufficient sensitivity of determining properties of the rock mass when layers with low difference in their properties are identified.

SUMMARY OF THE INVENTION

The proposed method provides enhanced accuracy and efficiency of the identification of rock mass areas with different thermal properties. The method also provides division of a rock mass located along a borehole into areas with different thermal properties—thermal conduction, thermal diffusivity and volumetric heat capacity. These areas may include, for example, areas with rock water- or oil-saturation, or areas with different degree of the rocks oil-saturation. All these areas may be identified because they are characterized with different thermal properties.

The method comprises thermally disturbing a rock mass or a part thereof by pumping a circulation fluid through a borehole using a tubing, wherein a temperature of the circulation fluid is different from a temperature of the rock mass, subsequent recording borehole temperature changes in at least one section of the borehole, and identifying areas of the rock mass with different thermal properties based on the measurement results. Differential electrical signals that are proportional to a temperature difference between two points along the borehole are recorded by at least one pair of difference temperature transducers located along an axis of the borehole so that a depth range of the location of the temperature transducers cover an area of the rock mass. The differential electrical signals are recorded prior to, during and after the thermal disturbance of the rock mass (or the part thereof), and the recording is performed continuously or periodically at time intervals of a pre-selected duration. The duration of the time intervals is determined based on properties of a temperature noise in the borehole and on a degree of possible deviation of thermal properties of the identified areas of the rock mass. Distances between the transducers in the pairs and a number of the pairs are selected in advance based on (i) a required accuracy of determining boundaries of areas of the rock mass with different properties, (ii) a minimum possible length and a maximum possible length of the areas of the rock mass and (iii) the properties and the degree of the temperature noise in the borehole. The amount of the thermal disturbance should be selected to provide a required ratio of the differential electrical signals to the borehole temperature noise. The differential electrical signals measured by pairs of temperature transducers before the thermal disturbance of the rock mass are compared with the differential electrical signals measured by the same temperature transducer pairs during the thermal disturbance. The differential electrical signals measured by different pairs of temperature transducers located along the borehole are also compared with one another. Based on results of the comparison of the differential electrical signals differences between the rock mass areas are characterized by their properties and boundaries between the rock mass areas with different thermal properties are identified.

The method may also comprise an additional measurement of temperature of the circulation fluid along the borehole before the thermal disturbance, during the thermal disturbance and after the thermal disturbance. Based on the data obtained a temperature behavior is determined, both during the rock mass thermal disturbance, and during the temperature recovery in the course of relaxation of the rock mass after the thermal disturbance. A start time, intervals and an ending time of the differential electrical signals measurement are selected and a decision to stop the thermal disturbance is made.

The thermal disturbance of the rock mass or the part thereof may be performed periodically with a pre-set duration of each thermal disturbance and with pauses between them or according to a harmonic law with pre-set frequency and intensity. Simultaneously an amplitude of oscillations of the differential electrical signals, and a phase shift of the oscillations relative to the thermal disturbance of the rock mass or the part thereof are measured. An amplitude of oscillations of the rock mass temperature and a phase shift of the oscillations of the rock mass temperature are also measured. After that based on the measurement results properties of the rock mass areas are determined.

In another embodiment the periodical disturbance of the rock mass or the part thereof is performed by means of the circulation fluid circulating in the tubing with periodical changing of direction of flow of the fluid. In this case a lower end of the tubing is located below the rock mass area so that in the rock mass area temperature of the circulation fluid periodically changes relative to an initial temperature of the area. A frequency of the circulation fluid flow direction change, a flow rate of the circulation fluid and a position of the tubing lower end are set based on the borehole temperature gradient to provide a sufficient amplitude of the differential electrical signals. An amplitude of the differential signals, and a phase shift of the differential signals relative to the thermal disturbance of the rock mass (or the part thereof) are measured. An amplitude of oscillations of the rock mass temperature and a phase shift of the oscillations of the rock mass temperature relative to the thermal disturbance of the rock mass or the part thereof are also measured.

The differential temperature transducers may be located on the tubing. In this case a diameter and a material of a section of the tubing at which the transducers are located are selected to provide (i) maximum differential electrical signals, (ii) a minimum effect of the fluid convective flow in a gap between a wall of the tubing and a wall of a casing string or a wall of the borehole on temperature noises taking place in the gap between the wall of the tubing and the wall of the casing string or the wall of the borehole during the thermal disturbance of the rock mass (or the part thereof) or after the thermal disturbance and (iii) a minimum blur of the temperature boundaries between the rock mass areas having different properties.

According another embodiment of the disclosure, a duration and an intensity of the thermal disturbance of the rock mass or the part thereof and times of measuring differential electrical signals after the thermal disturbance of the rock mass or the part thereof has started are selected taking into account the borehole temperature noise as a function of time and the borehole temperature noise existing at the moments of measurement of the differential electrical signals so as to obtain maximum ratios of the differential electrical signals to the borehole temperature noise.

According another embodiment of the disclosure in order to enhance the accuracy of determining the boundaries between the rock mass areas along the borehole based on their properties and to reduce the vagueness of the boundaries between the rock mass areas having different properties, a duration and an intensity of the thermal disturbance of the rock mass or the part thereof and the time of measurement of the differential electrical signals after the thermal disturbance has started are selected based on the properties and the degree of the borehole temperature noise before the measurement of the differential electrical signals so that spatial changes of the differential electrical signals in a zone between the areas of the rock mass with different properties were localized within the minimum distance range along the borehole.

In accordance with another embodiment of the disclosure in order to enhance the accuracy of the characterization of the properties of the rock mass (or the part thereof) and of the characterization of distributions of the properties in a direction perpendicular to the borehole both at the stage of the thermal disturbance of the rock mass or the part thereof as well as after the thermal disturbance, a time behavior of the differential electrical signals, maximum values of the differential signals and a time to attain the maximum values of the differential signals are determined. Based on these values a depth of an invasion zone of the circulation fluid and an oil-saturation of the rock mass or of the part thereof are determined.

According another embodiment of the disclosure, in order to enhance the accuracy of the characterization of the properties of the rock mass or the part thereof and characterization of the distribution of the properties in a direction perpendicular to the borehole, at least one additional thermal disturbance of the rock mass or the part thereof is performed. A duration of each additional thermal disturbance is different from duration of previous thermal disturbances. Differential electrical signals during the thermal disturbance of the rock mass or the part thereof and after each additional thermal disturbance are measured and every time maximum values of the differential signals and time to attain the maximum values of the differential signals both during the thermal disturbance and after the thermal disturbance are determined. Then, based on the data obtained during all thermal disturbances of the rock mass or the part thereof a depth of the circulation fluid invasion zone and an oil-saturation of the rock mass or the part thereof are determined.

According another embodiment of the disclosure an additional thermal disturbance is every time performed with the circulation fluid having a volume different from volumes of the circulation fluid used during previous thermal disturbances. Every time during or after the thermal disturbance of the rock mass or the part thereof differential electrical signals are measured, maximum values of the differential electrical signals and time to attain the maximum values of the differential electrical signals are found. Then, based on the data obtained during all thermal disturbances of the rock mass or the part thereof a depth of the circulation fluid invasion zone and an oil-saturation of the rock mass or the part thereof are determined.

If a casing string in the borehole is separated from the rock mass by a cement ring, in order to improve the accuracy of determining the properties of the rock mass or the part thereof by means of recording a temperature noise occurring due to changes of the cement ring thickness and deviations of the casing string and a tubing from a borehole axis, additional differential signals are recorded at the time when ratio of the differential electrical signals to the borehole temperature noise resulting from the changes of the thickness of the cement ring and the deviations of the casing string and the tubing from the borehole axis is maximum.

In still another embodiment of the disclosure a porosity in different parts of the rock mass along the borehole is determined. After that, based on results of additional measurements of maximum values of the differential signals, time of attainment of the maximum values of the differential signals and the porosity a depth of the circulation fluid invasion zone and an oil-saturation of the rock-mass or the part thereof are determined.

Another embodiment of the disclosure is characterized by the fact that during the thermal disturbance of the rock mass or the part thereof and after the thermal excitation in areas located in a gap between the tubing and a wall of the borehole at different distances from the tubing differential signals proportional to the temperature difference are additionally measured. Based on the measurement results the properties and the degree of the temperature noise are determined which are taken into account during processing of the differential electrical signals and subsequent determination of the rock mass properties.

According another embodiment of the disclosure at least one temperature transducer is moved along the borehole before the thermal disturbance of the rock mass or the part thereof and then, at least once, during the thermal disturbance, then a temperature distribution along the borehole is recorded using at least one temperature transducer moving along the borehole. A rate of temperature transducers' movement and a moment to start recording of the temperature distribution during the thermal disturbance of the rock mass or the part thereof are selected in such a way as to ensure an optimum signal/noise ratio. After that the properties of the rock mass (or the part thereof) are determined based on the temperature distribution along the borehole and the temperature variation rate in separate areas of the rock mass as a function of time.

According another embodiment of the disclosure the temperature is measured in several sections along the borehole before the thermal disturbance of the rock mass or the parts thereof and then the temperature is measured in the several sections along the borehole after the thermal disturbance has been started. A number of the borehole sections in which the temperature is measured is every time selected to ensure the required accuracy of the determination of the boundaries between the areas of the rock mass with different properties. Moments for measuring temperature along the wellbore borehole after the thermal disturbance has been started are selected to ensure an optimum signal/noise ratio. After that based on the temperature measurements made in these sections along the borehole before the thermal disturbance of the rock mass or the part thereof and after the thermal disturbance has been started a temperature distribution along the borehole characterizing the rock mass properties is determined and based on this temperature distribution the rock mass areas with different properties are determined.

According another embodiment of the disclosure differential electrical signals are additionally measured along one or more lines oriented along the borehole and located parallel to each other. A number of the lines and angles between them around the borehole axis are selected based on location of the rock mass areas and borehole space areas with different properties around the borehole axis.

In still another embodiment of the disclosure differential electrical signals proportional to a temperature difference in areas located in a gap between the tubing and a wall of the borehole at different distances from the tubing are measured along one or more lines oriented along the borehole and located parallel to each other. A number of the lines and angles between them around the borehole axis are selected based on location of the rock mass areas and borehole space areas with potentially different properties around the borehole axis.

For implementation of the method above an apparatus is proposed, the apparatus comprises a unit for injecting a circulation fluid into a borehole for thermally disturbing a rock mass or a part thereof by circulation of the fluid inside the borehole, a unit for adjusting the circulation fluid injection time and temperature transducers located along an axis of the borehole. The apparatus also comprises at least one pair of differential temperature transducers to receive differential electrical signals characterizing temperature difference between two points along the borehole and a unit generating the differential electrical signals for the temperature transducer pairs and providing the differential electrical signals proportional to the temperature difference between two points along the borehole. Distances between the transducers in the pairs and a number of the transducer pairs are selected based on (i) a required accuracy of determination of location of boundaries of rock mass areas with different properties, (ii) minimum and maximum possible lengths of the rock mass areas and (iii) a degree of a temperature noise in the borehole. Additionally the apparatus comprises a recording unit ensuring simultaneous recording of all differential signals and a unit for comparing and processing the differential signals measured at the same time moments, ensuring the identification of the rock mass areas with different properties based on results of the comparison and processing of the differential electrical signals.

According another embodiment of the disclosure the apparatus comprises a unit providing a periodical thermal disturbance of the rock mass or parts thereof with setting of a certain duration of each thermal disturbance and certain pauses between the thermal disturbances, or providing the thermal disturbance according to a harmonic law with pre-set frequency and intensity. Besides, the apparatus comprises a unit providing measurement of an amplitude of oscillations of the differential signals and a unit measuring a phase shift of the oscillations of the differential signals. The apparatus also comprises a unit measuring an amplitude of oscillations of the rock mass temperature and a unit measuring a phase shift of the oscillations of the rock mass temperature relative to the thermal disturbance of the rock mass or the part thereof.

According to another embodiment of the disclosure, the apparatus also comprises a unit providing periodical thermal disturbance of the rock mass or the part thereof by means of the fluid circulating in a tubing with a periodical change of the circulation fluid flow direction so that in the rock mass area temperature of the circulation fluid periodically changes relative to a temperature of the rock mass area. Besides, this apparatus also comprises a unit setting a frequency of changing of the circulation fluid flow direction, a flow rate of the circulation fluid and a position of a lower end of the tubing in the borehole taking into account a borehole temperature gradient. To determine the temperature gradient the apparatus comprises a unit evaluating the temperature gradient based on the temperature transducers' signals and a distance between the temperature transducers along the wellbore borehole.

According to another embodiment of the disclosure, the apparatus additionally comprises a unit for recording and amplitude-frequency analysis of the borehole temperature noise, this unit is connected with the temperature transducers. The unit for recording and amplitude-frequency analysis of the borehole temperature noise is also connected with the unit for comparing and processing the differential signals to ensure eliminating of the temperature noises with a similar frequency from the differential signals.

According another embodiment of the disclosure the apparatus comprises additional temperature transducers located at the same borehole levels as the differential temperature transducers used for recording the differential electrical signals along the borehole but at different distances from the tubing in a gap between the tubing and a wall of the borehole or a wall of a casing string. Besides, the apparatus comprises a unit providing measurement of the differential signals between all the additional transducers located at a similar depth in the borehole and a unit providing amplitude-frequency analysis of the differential electrical signals measured between all the additional transducers and resulting selection of the temperature noise existing in the gap between the tubing and the wall of the borehole or the wall of the casing string. Besides, the apparatus comprises a unit for taking into account and eliminating the noise selected from the differential electrical signals recorded by the pairs of the temperature transducers located along the borehole.

According another embodiment of the disclosure the apparatus comprises at least one additional set of temperature transducers located along the borehole. The additional sets of the temperature transducers are located along one or more lines oriented along the borehole and located parallel to one another as well as parallel to a line along which the differential temperature transducers for measuring the differential electrical signals are located. A number of the additional sets of temperature transducers and angles between the lines along which the temperature transducers of the additional sets are located around the borehole axis are selected based on the location of the rock mass areas and borehole space areas with different properties around the borehole axis.

According to one more embodiment of the disclosure, the apparatus additionally comprises temperature transducers for measuring differential electrical signals characterizing a temperature variation in the borehole in a radial direction from the tubing towards the borehole walls, these transducers are disposed on the tubing along one or more lines oriented along the borehole and located parallel to each other and to a line on which the temperature transducers are located and along which the differential signals are measured. A number of the lines and angles between these lines around the borehole axis are selected based on location of the rock mass areas and borehole space areas with different properties around the borehole axis.

According to another embodiment of the disclosure, the apparatus additionally comprises a unit providing movement of at least one temperature transducer and of the differential temperature transducers along the borehole. Besides, the apparatus additionally comprises a unit ensuring setting of a certain speed of the movement of the temperature transducers and of the differential temperature transducers along the borehole, as well as a unit ensuring a link of each temperature transducer to a depth for each moment of recording of the temperature and differential temperature signal. Besides the apparatus comprises a unit providing a periodical change of a direction of the temperature transducers' movement along the borehole at a preset time.

According to one more embodiment of the disclosure, the apparatus additionally comprises several temperature transducers located along the borehole. A number of the additional temperature transducers disposed along the borehole is selected to ensure a required accuracy of the determination of the boundaries between the rock mass areas with different properties. Besides, the apparatus comprises a unit for recording and processing the signals from the temperature transducers which is used to provide measuring of the temperature by the transducers at the pre-set time moments, recording of a temperature distribution along the borehole based on results of the temperature measurements before and during the thermal disturbance of the rock mass or the part thereof and identifying the rock mass areas with different properties.

According to one more embodiment of the disclosure, the apparatus comprises a unit providing injection of the circulation fluid into the borehole at a pre-set flow-rate per a time unit.

BRIEF DESCRIPTION OF THE DRAWINGS

The invention is explained by the drawing showing one of the embodiments of the method of studying the rock mass properties.

DETAILED DESCRIPTION OF THE PREFERRED EMBODIMENTS

As shown in FIG. 1, in a vertical borehole 1 drilled in a rock mass 2, in a depth interval 3 (2,000-2,030 m), the rock mass has a homogenous mineral composition of rocks and homogenous porosity, separate parts 4, 5, 6, characterized by different oil-saturation need to be identified. Since thermal properties of oil differ significantly from thermal properties of water (for example, under normal pressure and temperature conditions oil heat conductivity is 0.11-0.13 W/(m·° K), and water heat conductivity is 0.60 W/(m·° K)), volumetric heat capacity is $1.6 \cdot 10^6$ J/(m$^3$·° K) for oil and $4.2 \cdot 10^6$ J/(m$^3$·° K) for water), a difference of separate sections 4, 5, 6 of the rock mass 2 in thermal properties will mean a difference of separate sections 4, 5, 6 in oil saturation. To provide a thermal disturbance of the rock mass 2 a circulation fluid is injected into the borehole 1 through a tubing 7, the circulation fluid temperature significantly differs from the temperature of the rock mass 2 at the depth of 2,000-2,030 m of the interval 3. Running of the tubing 7 is prepared in such a way as to provide disposing of a lower end 8 of the tubing 7 at the depth of 2,050 m after running, i.e. below the depth of 2,030 m which is a lower limit of the depth interval 3. Assuming an accuracy of determining boundaries of the sections 4, 5, 6 of the rock mass 2 to be 1 meter, a possible length of the sections 4, 5, 6 with different thermal properties to be not less than 2 m, and a length of thermal convection cells of the circulation fluid in the borehole 1 to be not less than 30 m, 35 temperature transducers 9 are disposed on the tubing 7 along its outer surface at 1-meter interval. The temperature transducers 9 are disposed on the tubing 7 along the borehole 1 so that a depth interval of the transducers 9 is 1,998-2,032 m, i.e., covers the depth interval 3, in which the sections 4, 5 and 6 of the rock mass 2 with different thermal properties need to be identified. Pre-calibrated resistance thermometers or optical temperature transducers (special fiber-optic cable for temperature measurement in different points along the cable) are used as the transducers 9. The temperature transducers 9 provide temperature recording in each point of the transducers 9 location and differential temperature recording for different pairs of the temperature transducers 9. Then, mathematical modeling is performed based on a supposed range of thermal properties of the rock mass 2, diameter and depth of the borehole 1, existence of a casing string 10, a thickness of a cement ring 11 between the casing string 10 and walls of the borehole 1, and properties of the circulation fluid being injected. A rate and a duration of the injection of the circulation fluid into the borehole 1 are determined as 8 liters per second and 4 hours, respectively, a time period duration after completion of the circulation fluid injection into the tubing 7 during which the temperature of the sections 4, 5, 6 with different thermal properties of the rock mass 2 will differ is determined as 6 hours and a time period between measurements of the differential temperature is determined as 1 minutes determined by means of mathematical modeling. A degree of the thermal disturbance of the rock mass 2 in its separate part 3 is selected so as to provide the required value of the ratio of the differential electrical signals to temperature noise electrical signals in the borehole 1 as 50:1. Then the tubing 7 is lowered into the borehole 1 so that the lower end 8 of the tubing 7 is disposed at the depth of 2,050 m, and before starting the thermal disturbance of the rock mass 2 temperatures are recorded with the temperature transducers 9. Differential temperatures for various pairs of the temperature transducers 9 are also recorded. After that thermal disturbance of the rock mass 2 is started by injecting the circulation fluid into the tubing 7 and maintaining a constant temperature of the circulation fluid at an inlet of the tubing 7 within 15-17° C. which is significantly lower than 69° C. recorded in the borehole 1 before. During the circulation fluid injection into the borehole 1, the temperature in the borehole 1 is recorded using the temperature transducers 9. Temperature difference for the sections 4, 5, 6 of the rock mass 2 or between the sections of the rock mass 2 equally spaced along the borehole 1 are also recorded. The injection of the circulation fluid into the borehole 1 is stopped after four hours and recording of the differential temperature values in the points of location of the transducers 9 is continued for another 6 hours with intervals between measurements of 1 min. In order to take into account spatial temperature variations in the borehole 1 existing in the borehole 1 before the injection of the circulation fluid, differential electrical signals of different pairs of the temperature transducers 9 located along the borehole 1 and measured before the thermal disturbance of the rock mass 2 are compared with differential electrical signals of the different pairs of the temperature transducers 9 located along the borehole 1 and measured after starting of the thermal disturbance of the rock mass 2. Thus spatial variations of the temperature along the borehole 1 eliminating an influence of the temperature spatial variations in the borehole 1 before the injection of the circulation fluid are determined. After that differential electrical signals of the temperature transducers 9 obtained after the elimination of the influence of the temperature spatial variations in the borehole 1 before the injection of the circulation fluid are compared with each other. If a temperature difference measured by differential method for one pair of the temperature transducers 9 during the injection of the circulation fluid or after the injection is equal to the value of the noise for differential temperature measurements, it means that both temperature transducers 9 of the pair are located in a section or sections of the rock mass 2 with similar thermal properties and, consequently, the oil-saturation of the rocks is identical within the measurement accuracy. If the temperature difference measured by the differential method for one pair of the temperature transducers 9 during the injection of the circulation fluid or after the injection exceeds the noise value for the temperature differential measurements, it means that both transducers of the pair are located in two sections of the sections 4, 5, 6 of the rock mass with different thermal properties, and consequently, oil saturation of the rock mass 2 in these two sections is different. Determination of oil saturation and identification of sections with a larger or smaller oil saturation is performed by means of comparison of the differential temperatures measured and by a sign (plus or minus) of the differential temperature. Based on results of the comparison the sections 4, 5, 6 of the rock mass 2 with different thermal properties are identified and boundaries of these sections 4, 5, 6 with different thermal properties are determined. Based on the results of the identification of the sections 4, 5, 6 with different thermal properties of the rock mass 2 the sections 4, 5, 6 of the rock mass 2 with different oil saturation are identified.

Additional examples of the implementation of the disclosure are cases of identifying sections 4, 5, 6 with different thermal properties of the rock mass 2 when there is a significant depth-variable random deviation of an axis of the tubing 7 or an axis of the casing string 10 from the borehole 1 axis (in the latter case it will result in change of the thickness of the cement ring 11) or there is an eccentricity of the tubing 7 or of the casing string 10 within the depth range 3 in which the sections 4, 5, 6 with different thermal properties which need to be identified are disposed. In both cases, significant change of a thermal resistance between the walls of the tubing 7 and walls of the borehole 1 will take place which will result in a significant noise in the recorded values of the temperature and the differential temperatures at different depths and, consequently, will complicate the identification of the sections 4, 5, 6 of the rock mass 2 with different thermal properties.

To reduce this noise in the case of identification of the sections 4, 5, 6 with different thermal properties in the depth range of 2,000-2,030 m, in addition to 35 temperature transducers 9 installed along the tubing 7 with the interval of 1 m additional sets comprising 35 temperature transducers 9 with an between adjacent temperature transducers 9 equal to 1 m. In case of probable azimuth deviations of the axis of the tubing 7 and of the axis of the casing string 10 axis relative to the borehole 1 axis as well as in case of eccentricity of the tubing 7 and of the casing string 10 uniformly distributed around the axes of the tubing and the casing string three additional sets of temperature transducers 9 are mounted along the axis of the tubing 7. Lines of disposing of all four sets of the temperature transducers 9, each set comprising 35 temperature transducers 9, are uniformly distributed along the circumference of the tubing 7. The differential electrical signals are measured simultaneously along the four lines oriented along the borehole 1 and located parallel to one another. The results of each measurement of the differential temperature obtained for each of the four pairs of temperature transducers 9 at the similar depths in the borehole 1 are averaged. The average values of the differential temperature are used to identify the sections 4, 5, 6 of the rock mass 2 with different thermal properties as it was done in the preceding case of the implementation of the disclosure.

What is claimed is:

1. A method of studying properties of a rock mass, the method comprising:

thermally disturbing the rock mass or a part thereof by circulating a fluid through a borehole using a tubing, wherein a temperature of the circulation fluid is different from a temperature of the rock mass, recording temperature along the borehole using temperature transducers, recording differential electrical signals that are proportional to a temperature difference between two points along the borehole before, during, and after the thermal disturbance, wherein the recording is performed continuously or periodically at time intervals of a pre-selected duration determined based on (i) properties of temperature noise in the borehole and (ii) a degree of possible deviation of thermal properties of the rock mass and the recording is performed by at least one pair of differential temperature transducers located along an axis of the borehole, so that a depth range of the location of the differential temperature transducers covers an area of the rock mass and distances between the transducers in the pairs and a number of the pairs are selected in advance based on (i) a required accuracy of determining a location of boundaries of rock mass areas with different properties, (ii) a minimum possible length and a maximum possible length of the rock mass areas, and
(iii) the properties and a degree of the temperature noise in the borehole, comparing the differential electrical signals measured by the pairs of the differential temperature transducers before the thermal disturbance of the rock mass with the differential electrical signals measured by the same pairs of the differential temperature transducers during the thermal disturbance, comparing the differential electrical signals measured by different pairs of the differential temperature transducers located along the borehole axis, characterizing differences between the rock mass areas by their properties based on the results of the comparison of the differential electrical signals, and identifying boundaries between the rock mass areas with different thermal properties.

2. The method of claim 1 wherein the amount of the thermal disturbance is selected to ensure a required ratio of the differential electrical signals to the borehole temperature noise electrical signals.

3. The method of claim 1 wherein temperature of the circulation fluid is measured along the borehole before the thermal disturbance, during the thermal disturbance, and after the thermal disturbance, and, based on the data obtained, a temperature behavior both during the thermal disturbance and during temperature recovery in the course of relaxation of the rock mass after the thermal disturbance is determined, a start time, intervals and an ending time of the measurements of the differential electrical signals are selected and a decision to stop the thermal disturbance is made.

4. The method of claim 1 wherein the thermal disturbance of the rock mass or the part thereof is performed according to a harmonic law with preset frequency and intensity and, simultaneously, an amplitude of oscillations of the differential signals is measured, a phase shift of the oscillations relative to the thermal disturbance of the rock mass or the part thereof is measured, an amplitude of oscillations of the rock mass temperature is measured, and a phase shift of the rock mass temperature is measured.

5. The method of claim 1 wherein the temperature transducers are located on the tubing and a diameter and a material of a section of the tubing at which the temperature transducers are located are selected to provide (i) maximum differential electrical signals, (ii) a minimum effect of the fluid convective flow in a gap between a wall of the tubing and a wall of a casing string or a wall of the borehole onto temperature noises taking place in the gap between the tubing and the wall of the casing string or the wall of the borehole during the thermal disturbance of the rock mass or the part thereof or after the thermal disturbance and (iii) a minimum blurring of the temperature boundaries between the rock mass areas with different properties.

6. The method of claim 1 wherein a duration and an intensity of the thermal disturbance of the rock mass or the part thereof and times of measuring the differential electrical signals during the thermal disturbance are selected taking into account the borehole temperature noise as a function of time and the borehole temperature noise existing at the moments of measurement of the differential electrical signals so as to obtain maximum ratios of the differential electrical signals to the borehole temperature noise.

7. The method of claim 1 wherein a duration and an intensity of the thermal disturbance of the rock mass or the part thereof and times of measuring of the differential electrical signals during the thermal disturbance are selected based on the properties and the degree of the borehole temperature noise before the measurement of the differential electrical signals so that spatial changes of the differential electrical signals in a zone between the areas of the rock mass with different properties were localized within the minimum distance range along the borehole.

8. The method of claim 1 wherein during the thermal disturbance of the rock mass or the part thereof and after the thermal disturbance a time behavior of the differential electrical signals, maximum values of the differential electrical signals and a time to attain the maximum values of the differential signals are determined and, based on these values, a depth of an invasion zone of the circulation fluid and an oil saturation of the rock mass or the part thereof are determined.

9. The method of claim 1 wherein a casing string in the borehole is separated from the rock mass by a cement ring and the differential electrical signals are recorded when a ratio of the differential electrical signals to the temperature noise in the borehole resulting from changes of thickness of the cement ring and deviations of the tubing and the casing string from an axis of the wellbore is maximum.

10. The method of claim 1 wherein a porosity in different parts of the rock mass along the borehole, maximum values of the differential electrical signals and a time to attain the maximum values of the differential signals are determined, and, based on the results, a depth of an invasion zone of the circulation fluid and an oil saturation of the rock mass or the part thereof are determined.

11. The method of claim 1 wherein during and after the thermal disturbance of the rock mass or the part thereof in areas located in a gap between the tubing and a wall of the borehole at different distances from the tubing additionally differential signals proportional to the temperature difference are measured and based on the measurement results the properties and the degree of the temperature noise are determined which are taken into account during the processing of the differential electrical signals and subsequent determination of the rock mass properties.

12. The method of claim 1 wherein at least one temperature transducer is moved along the borehole before the thermal disturbance of the rock mass or the part thereof and then at least once during the thermal disturbance and temperature distribution along the borehole is recorded using the at least one temperature transducer moving along the borehole, a rate of the movement of the temperature transducers and a moment to start recording of the temperature distribution during the thermal disturbance are selected so as to ensure an optimum signal/noise ratio.

13. The method of claim 1 wherein additionally temperature is measured in several sections along the borehole before and during the thermal disturbance of the rock mass or the part thereof a number of the sections along the borehole is selected to provide the required accuracy of the determination of the boundaries between the rock mass areas with different properties, moments for measuring temperature along the borehole are selected to ensure an optimum signal/noise ratio, a temperature distribution along the borehole characterizing the rock mass properties is determined based on which the rock mass areas with different properties are determined.

14. The method of claim 1 wherein differential electrical signals are additionally measured along one or more lines oriented along the borehole and located parallel to one another, a number of the lines and angles between these lines around the wellbore axis are selected based on location of rock mass and wellbore space areas with potentially different properties.

15. The method of claim 1 wherein the thermal disturbance of the rock mass or the part thereof is performed periodically with a pre-set duration of each thermal disturbance and with pauses between them and, simultaneously, an amplitude of oscillations of the differential signals is measured, a phase shift of the oscillations relative to the thermal disturbance of the rock mass or the part thereof is measured, an amplitude of oscillations of the rock mass temperature is measured, and a phase shift of the oscillation of the rock mass temperature is measured.

16. The method of claim 15 wherein the periodical thermal disturbance of the rock mass or the part thereof is performed by means of circulation of the circulation fluid in the tubing with periodical changing of direction of flow of the circulation fluid, a lower end of the tubing is located below the rock mass area so that in the rock mass area temperature of the circulation fluid periodically changes relative to the temperature of the rock mass area, wherein a frequency of the circulation fluid flow direction change, a flow rate of the circulation fluid and a position of the lower end of the tubing in the borehole are set based on the borehole temperature gradient to provide a sufficient amplitude of the differential electrical signals.

17. The method of claim 1 wherein at least once an additional thermal disturbance of the rock mass or the part thereof is performed, a duration of each additional thermal disturbance is different from duration of previous thermal disturbances, differential electrical signals are measured during each additional thermal disturbance and after each additional thermal disturbance, maximum values of the differential signals and times to attain the maximum values of the differential signals are determined both during and after the thermal disturbance, after that, based on the data obtained during all cycles of the thermal disturbance of the rock mass or the part thereof a depth of an invasion zone of the circulation fluid and an oil saturation of the rock mass or the part thereof are determined.

18. The method of claim 17 wherein the additional thermal disturbance is every time performed with the circulation fluid having a volume different from volumes of the circulation fluid used in previous thermal disturbances.

19. An apparatus for studying properties of a rock mass, the apparatus comprising:
a unit for injecting a circulation fluid into a borehole to perform a thermal disturbance of the rock mass or a part thereof by circulating the circulation fluid inside the borehole,
temperature transducers disposed along the borehole,
at least one pair of temperature transducers to receive differential electrical signals characterizing temperature difference between two points along the borehole,
a unit for generating the differential electric signals for the at least one pair of temperature transducers and providing the differential electric signals that are proportional to the temperature difference between the two points along the borehole, wherein distances between the transducers in the pairs and a number of the transducer pairs are selected based on (i) a required accuracy of determining a location of boundaries of rock mass areas with different properties, (ii) a minimum possible length and a maximum possible length of the rock mass areas to be identified and (iii) properties and a degree of a temperature noise in the borehole,
a unit for adjusting the circulation fluid injection time,
a recording unit for simultaneous recording of the differential signals and
a unit for comparing and processing the differential signals measured at the same time moments for identification of the rock mass areas with different properties based on results of the comparison and of processing of the differential electrical signals.

20. The apparatus of claim 19 further comprising a unit providing a periodical thermal disturbance of the rock mass or the part thereof with setting of a certain duration of each thermal disturbance and certain pauses between the thermal disturbances or providing the thermal disturbance according to a harmonic law with preset frequency and intensity.

21. The apparatus of claim 19 further comprising a unit providing measurements of an amplitude of oscillations of the differential signals, a unit measuring a phase shift of the oscillations of the differential signals, a unit measuring an amplitude of oscillations of the rock mass temperature and a unit measuring a phase shift of the oscillations of the rock mass temperature oscillations relative to the thermal disturbance of the rock mass or the part thereof.

22. The apparatus of claim 19 further comprising a unit providing a periodical thermal disturbance of the rock mass or the part thereof by circulating the circulation fluid in a tubing with a periodical change of the circulation fluid flow direction so as to provide a periodical change of the circulation fluid temperature relative to a temperature of the rock mass, a unit setting a frequency of changing of the circulation fluid flow direction, a flow rate of the circulation fluid and a position of a lower end of the tubing in the borehole taking into account a temperature gradient, and a unit evaluating the temperature gradient based on the electrical signals of the temperature transducers and on a distance between the temperature transducers along the borehole.

23. The apparatus of claim 19 further comprising a unit for recording and frequency amplitude analysis of the borehole temperature noise connected with the temperature transducers and with the unit for comparing and processing the differential signals to eliminate temperature noises with similar frequencies from the differential signals.

24. The apparatus of claim 19 further comprising additional temperature transducers located at the same levels of the borehole as the temperature transducers used for recording the differential electrical signals along the borehole but at different distances from the tubing in a gap between the tubing and a wall of the borehole or a wall of a casing string, a unit for measuring the differential signals between all the additional transducers located at a similar depth in the borehole, a unit providing amplitude frequency analysis of the differential electrical signals measured between all the additional transducers, and resulting selection of a temperature noise existing in the gap between the tubing and the wall of the borehole or the wall of the casing string, and a unit for taking into account and eliminating the selected noise from the differential electrical signals recorded by the pairs of the temperature transducers located along the wellbore.

25. The apparatus of claim 19 further comprising at least one additional set of temperature transducers located along at least one line oriented along the borehole, wherein the lines along which the additional sets of the temperature transducers are located are parallel to each other and parallel to a line along which the temperature transducers used for the differential electrical signals measurement are disposed, a number of the additional sets of temperature transducers and angles between the lines along which the temperature transducers in the additional sets are located around an axis of the borehole are selected based on the location of the rock mass areas and wellbore space areas with potentially different properties around the axis of the borehole.

26. The apparatus of claim 19 further comprising temperature transducers for measuring differential electrical signals characterizing a temperature variation in the borehole in a radial direction from the tubing towards the borehole walls, these transducers are disposed on the tubing along at least one line oriented along the borehole, wherein the lines along which these transducers are disposed are located parallel to each other and parallel to a line along which the temperature transducers used for the differential signals measurement are disposed, a number of the lines and angles between these lines around the borehole axis are selected based on the location of the rock mass areas and wellbore space areas with potentially different properties around the borehole axis.

27. The apparatus of claim 19 further comprising a unit providing movement of at least one temperature transducer and of the differential temperature transducers along the borehole, a unit for setting a certain speed of the movement of the at least one temperature transducer and the differential temperature transducers along the borehole and a unit linking each temperature transducer to a depth for each moment of recording of temperature and differential temperature signal, and a unit providing a periodical change of a direction of the movement of the temperature transducers along the borehole at a preset time.

28. The apparatus of claim 19 further comprising several temperature transducers located along the borehole, wherein a number of the transducers is selected to provide a required accuracy of determination of the boundaries between the rock mass areas with different properties, and a unit for recording and processing the signals from the transducers, the unit is used to provide measuring of the temperature by the transducers at pre-set time moments, recording of temperature distribution along the borehole based on the results of the temperature measurements before and during the thermal disturbance of the rock mass or the part thereof and identifying the rock mass areas with different properties.

29. The apparatus of claim 19 further comprising a unit providing injection of the circulation fluid into the borehole with a pre-set flow-rate per a time unit.

* * * * *